United States Patent
Hanstein et al.

(10) Patent No.: US 6,891,376 B2
(45) Date of Patent: May 10, 2005

(54) METHOD FOR ATTENUATING CONDUCTIVE SONDE MANDREL EFFECTS IN AN ELECTROMAGNETIC INDUCTION WELL LOGGING APPARATUS

(75) Inventors: Tilman Hanstein, Houston, TX (US); Horst Rueter, Dortmund (DE); Kurt M. Strack, Houston, TX (US)

(73) Assignee: KJT Enterprises, Inc., Houston, TX (US)

( * ) Notice: Subject to any disclaimer, the term of this patent is extended or adjusted under 35 U.S.C. 154(b) by 76 days.

(21) Appl. No.: 10/611,499

(22) Filed: Jul. 1, 2003

(65) Prior Publication Data

US 2005/0001623 A1 Jan. 6, 2005

(51) Int. Cl.⁷ .............................. G01V 3/08; G01V 3/12; G01V 3/18
(52) U.S. Cl. ...................... 324/333; 324/323; 324/332; 324/347
(58) Field of Search ................................ 324/232, 327, 324/333, 334, 337, 338, 339, 354, 355, 356, 357, 366, 369, 332; 342/332

(56) References Cited

U.S. PATENT DOCUMENTS

| 4,467,425 A | * | 8/1984 | Schaefer et al. ............... 702/7 |
| 4,604,581 A | | 8/1986 | Thadani et al. |
| 4,611,173 A | * | 9/1986 | Bravenec et al. ........... 324/339 |
| 4,651,101 A | * | 3/1987 | Barber et al. ................ 324/339 |
| 5,038,107 A | * | 8/1991 | Gianzero et al. ........... 324/339 |
| 5,260,661 A | * | 11/1993 | Vail, III ...................... 324/339 |
| 5,282,133 A | | 1/1994 | Watson |
| 5,329,235 A | | 7/1994 | Zhou et al. |
| 5,619,411 A | | 4/1997 | Smith |
| 5,672,867 A | | 9/1997 | Gadeken et al. |
| 6,253,155 B1 | | 6/2001 | Hagiwara |
| 2003/0076107 A1 | * | 4/2003 | Fanini et al. ................ 324/339 |

OTHER PUBLICATIONS

La Coste, L. Deconvolution by successive approximation, Geophysics, vol. 47, No. 12, pp. 1724–1730.
Stolz, E. et al., Evaluating EM waveforms by singular value decomposition of exponential basis functions, Geophysics, vol. 63, No. 1, pp. 64–74.
Ioup, G. et al., Iterative Deconvolution, Geophysics, vol. 48, No. 9, pp. 1287–1290.

* cited by examiner

Primary Examiner—N. Le
Assistant Examiner—Kenneth J Whittington
(74) Attorney, Agent, or Firm—Richard A. Fagin (57) ABSTRACT

An electromagnetic induction logging method is disclosed. The method includes measuring electromagnetic induction response in earth formations surrounding a wellbore. The measuring is performed on an electrically conductive sonde support. The measured response is deconvolved with respect to a response of an instrument not having an electrically conductive sonde support.

28 Claims, 8 Drawing Sheets

METHOD FOR ATTENUATING CONDUCTIVE SONDE MANDREL EFFECTS IN AN ELECTROMAGNETIC INDUCTION WELL LOGGING APPARATUS

CROSS-REFERENCE TO RELATED APPLICATION

Not applicable.

STATEMENT REGARDING FEDERALLY SPONSORED RESEARCH OF DEVELOPMENT

Not applicable.

BACKGROUND OF THE INVENTION

1. Field of the Invention

The invention relates generally to the field of electromagnetic induction well logging. More specifically, the invention relates to methods for induction logging using electromagnetic induction well logging instruments having an electrically conductive instrument housing or sonde support.

2. Background Art

Electromagnetic induction well logging is known in the art for determining electrical properties of earth formations penetrated by a wellbore, such as resistivity, dipole constant, and various nuclear magnetic resonance properties, for example. In electromagnetic induction logging, an instrument is lowered into the wellbore. The instrument includes an induction antenna ("transmitter antenna") coupled to a source of alternating current (AC) having a preselected waveform or a dynamically controllable waveform. Characteristics of the AC waveform, for example, frequency content and amplitude envelope, are selected with respect to the particular properties of the Earth's formations that are being measured. The instrument also includes one or more induction antennas ("receiver antenna(s)") disposed at axially spaced apart positions along the instrument from the transmitter antenna. Some types of electromagnetic measuring instruments, particularly nuclear magnetic resonance instruments, may use the same antenna for both transmitter and receiver functions. The receiver antenna(s), irrespective of whether they are the same or different than the transmitter antenna, are coupled to circuits which analyze and/or record properties of voltages induced in the receiver antenna(s). Properties of the voltages are analyzed to determine the selected electrical characteristics of the Earth's formations surrounding the instrument. The analyzed properties of the voltages include, for example, amplitude, frequency content and phase with respect to the AC coupled to the transmitter antenna.

A common type of induction antenna, which is used for both transmitter and receiver functions on a typical induction well logging instrument is a so-called magnetic dipole. Magnetic dipole antennas are typically formed as a wire loop or coil. The magnetic dipole moment of the loop or coil is oriented substantially perpendicular to the plane of the loop, or in the case of a coil, substantially parallel to the effective axis of the coil. The loops or coils are typically disposed in appropriate locations on or near the exterior surface of the instrument housing. As a result of the structure of the typical magnetic dipole antenna, the material from which the instrument housing is made becomes important in determining the response of the instrument to the electrical properties of the Earth's formations surrounding the wellbore.

Some types of electromagnetic induction well logging instruments are adapted to be lowered into the wellbore and removed therefrom by means of an armored electrical cable coupled to the instrument housing. This type of instrument is known as a "wireline" instrument. Typically, in wireline induction logging instruments the portion of the instrument housing that includes the transmitter and receiver antennas is made from electrically non-conductive, and non-magnetically permeable material to avoid impairing the response of the well logging instrument to the earth formations surrounding the wellbore.

It is also known in the art to convey well logging instruments into the wellbore as part of a drilling tool assembly ("drill string"). Such "measurement while drilling" (MWD) logging instruments include various forms of electromagnetic induction logging instruments. As a practical matter, MWD logging instruments have steel or other high strength, metallic housings so that the instrument housing can also properly perform the function of a part of the drill string. As a result, the housings of typical MWD well logging instruments are nearly always electrically conductive. See, for example, U.S. Pat. No. 5,757,186 issued to Taicher et al. and U.S. Pat. No. 5,144,245 issued to Wisler. The circuits used in such MWD instruments, and the type of electrical properties measured using such instruments are determined, to a substantial degree, by the presence of the conductive housing ("drill collar") in such MWD instruments.

It is also known in the art to include high strength, yet electrically conductive support rods inside wireline electromagnetic induction well logging instrument in order to enable such instruments to support the weight of additional well logging instruments coupled below the induction logging instrument. See, for example, U.S. Pat. No. 4,651,101 issued to Barber et al.

It is well known in the art to include a magnetically permeable material, such as ferrite, inside the coil or loop of wire forming a magnetic dipole induction antenna for the purpose of increasing the dipole moment of Such antennas with respect to the selected loop or coil size and configuration. See the previously cited Taicher et al. '186 patent, for example.

It is also known in the art to measure transient electromagnetic characteristics of Earth's formations surrounding a wellbore using a particular type of electromagnetic induction logging instrument. For example, U.S. Pat. No. 5,955,884 issued to Payton et al. discloses an instrument having at transmitter antenna coupled to a source of AC, and electromagnetic and dipole electric receivers antennas disposed on the instrument at locations spaced apart from the transmitter antenna. The AC source has a waveform adapted to induce transient electromagnetic induction effects in the earth formations surrounding the wellbore. The induction receiver and dipole electric receiver antennas detect voltages that are related to transient electromagnetic properties of the formations. It has been impracticable to provide instruments such as disclosed in the Payton et al. '884 patent with a larger electrically conductive housing because conductive housings can reduce the antenna sensitivity to the point where it is difficult to detect sufficient induction signal. Therefore, it has proven impractical for such instruments to be part of the drill string, such as in an MWD well logging instrument.

Geophysical data processing methods known in the art as "deconvolution" have been used to improve the quality of geophysical measurements, including seismic surveying and wellbore logging. Generally speaking, deconvolution can be used to compensate the actual measurements made by a geophysical measurement system for physical limitations of the measurement system. For example, in seismic surveying, it is a goal of seismic data processing to determine, as closely as possible, the seismic reflection response of the Earth to an acoustic "impulse." An impulse is a theoretical burst of energy having zero time duration, and as a result, essentially equal energy amplitude at all frequencies. Real seismic sources cannot develop such an impulse, if for no other reason than physically embodied apparatus cannot move instantaneously. Deconvolution is used in seismic surveying to adjust the measured reflection response of the Earth with respect to the actual "signature" (waveform) of the seismic energy imparted to the earth. In one example, deconvolution includes generating a "deconvolution operator" which when applied to the actual energy source signature results in as close as possible to an impulse. The same deconvolution operator can then be applied to the measured seismic data to adjust the response. See, for example, E. A. Robinson and S. Treitel, *Geophysical Signal Analysis*, Prentice Hall (1980) p. 466.

Methods of deconvolution are also known in the art for use in electromagnetic (EM) data analysis, in particular electromagnetic transient induction techniques. See, for example, K. M. Strack, *Exploration With Deep Transient Electromagnetics*, Elsevier, Amsterdam (1992). Still other deconvolution methods are described in, Ioup, G. E. and Ioup, J. W., *Iterative Deconvolution*, Geophysics 48, p. 1287–1290, Society of Exploration Geophysicists (1983).

Various forms of deconvolution have also been applied to conventional electromagnetic induction well logging data for some time. See, for example, U.S. Pat. Nos. 4,467,425 and 4,604,581. Deconvolution processing has also been used for electromagnetic propagation well logging, such as used in measurement-while-drilling (MWD) systems. One example of deconvolution for MWD resistivity measurements is disclosed in U.S. Pat. No. 5,329,235. Deconvolution has also been used to improve the results of various nuclear logging processes. See, for example, U.S. Pat. Nos. 5,619,411, 5,672,867 and 5,282,133 (which deals with nuclear magnetic resonance logging).

All of the above methods for deconvolution are generally related to improving the response of measuring systems due to the physical limitations of the energy used to activate the earth in the process of measuring, or to improve the spatial response of the measuring system to adjust for the physical limitations of the measuring system. More particularly, deconvolution as applied to electromagnetic induction well logging as known in the art is generally for the purpose of improving the axial resolution of the induction measuring system.

As explained above, many electromagnetic induction well logging instruments are adapted to be lowered into the wellbore and removed therefrom by means of an armored electrical cable coupled to the instrument housing. Typically, the portion of the instrument housing that includes the transmitter and receiver antennas is made from electrically non-conductive, and non-magnetic material to avoid impairing the response of the well logging instrument to the earth formations surrounding the wellbore. MWD logging instruments also include various forms of electromagnetic induction logging instruments. As a practical matter, MWD logging instruments have steel or other high strength, metallic housings so that the instrument housing can also properly perform the function of a part of the drill string. As a result, the housings of typical MWD well logging instruments are nearly always electrically conductive. Still further, it is also known in the art to include high strength, electrically conductive support rods inside wireline electromagnetic induction well logging instruments in order to enable such instruments to support the weight of additional well logging instruments coupled below the induction logging instrument. See, for example, U.S. Pat. No. 4,651,101 issued to Barber et al.

Because of the desirability of including a conductive support within an electromagnetic induction logging apparatus as explained above, it is desirable to have a method to adjust the response of such instruments for the effect of the conductive sonde support.

SUMMARY OF THE INVENTION

One aspect of the invention is an electromagnetic induction logging method. The method according to this aspect of the invention includes measuring electromagnetic induction response in Earth formations surrounding a wellbore. The measuring is performed on an electrically conductive sonde support. The measured response is deconvolved with respect to a response of an instrument not having an electrically conductive sonde support.

In one embodiment, the deconvolution is embedded deconvolution. In another embodiment, the deconvolution is direct deconvolution. In another embodiment, the deconvolution is parameterized deconvolution. In still another embodiment, the deconvolution is iterative deconvolution.

In one embodiment, the measuring includes measuring transient electromagnetic response of the earth formations.

Another aspect of the invention is an electromagnetic induction logging method. A method according to this aspect of the invention includes characterizing response of an electromagnetic well logging instrument having an electrically conductive support therein within a known conductivity environment. Response of an antenna and circuit system physically arranged substantially the same as an antenna and circuit system within the well logging instrument is then characterized in substantially the same known conductivity environment. A convolution operator is then determined which causes the response of the antenna and circuit system to substantially match the response of the well logging instrument. A deconvolution operator is determined from the convolution operator. Electromagnetic induction response in earth formations surrounding a wellbore is measured using the well logging instrument, and the measured response in the earth formations is deconvolved using the deconvolution operator.

Other aspects mid advantages of the invention will be apparent from the following description and the appended claims.

DETAILED DESCRIPTION

In its most general terms, the invention relates to electromagnetic induction well logging instruments having an electrically conductive support structure therein. The electrically conductive support structure is disposed within electromagnetic antennas used to energize earth formations and to detect various electromagnetic phenomena from the formations surrounding a wellbore. The electrically conductive support structure makes it practical to include such electromagnetic instruments within a metal drill collar or within an extended length wireline" well logging instrument string.

Figure 1:
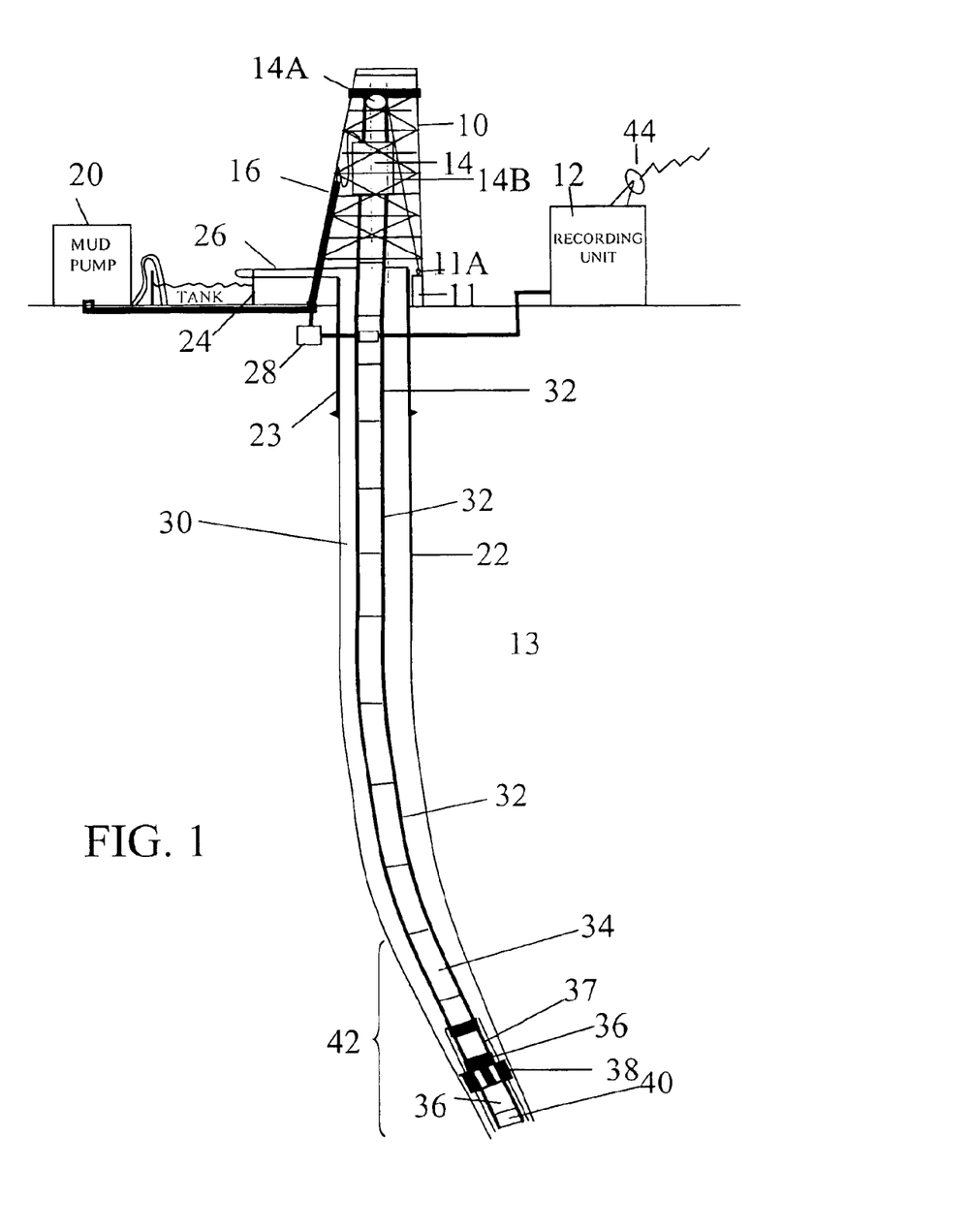
FIG. 1 shows a system for drilling a wellbore which includes an example embodiment of a well logging instrument according to the invention.

FIG. 1 shows a typical wellbore drilling system which may be used with various embodiments of an electromagnetic induction well logging instrument. This embodiment of the instrument is explained within the context of measurement while drilling systems because such systems typically require that the well logging instruments included in them be disposed in or about steel or other metallic, high strength, but electrically conductive drill collar structures. It should be clearly understood that embodiments of the invention also can be related to or used with "wireline" induction logging instruments, and that the invention is not limited in scope to measurement while drilling embodiments.

In FIG. 1, a drilling rig 10 includes a drawworks 11 or similar lifting device known in the art to raise, suspend and lower a drill string. The drill string includes a number of threadedly coupled sections of drill pipe, shown generally at 32. A lowermost part of the drill string is known as a bottom hole assembly ("BHA") 42, which includes, in the embodiment of FIG. 1, a drill bit 40 to cut through earth formations 13 below the earth's surface. The BHA 42 may include various devices such as heavy weight drill pipe 34, and drill collars 36. The BHA 42 may also include one or more stabilizers 38 that include blades thereon adapted to keep the BHA 42 roughly in the center of the wellbore 22 during drilling. In various embodiments, one or more of the drill collars 36 may include a measurement while drilling ("MWD") sensor and telemetry unit (collectively "MWD system"), shown generally at 37. The sensors included in the MWD system 37 will be further explained below with reference to FIG. 1A.

The drawworks 11 is operated during active drilling so as to apply a selected axial force to the drill bit 40. Such axial force, as is known in the art, results from the weight of the drill string, a large portion of which is suspended by the drawworks 11. The unsuspended portion of the weight of the drill string is transferred to the bit 40 as axial force. The bit 40 may be rotated by turning the pipe 32 using a rotary table/kelly bushing (not shown in FIG. 1), or preferably may be rotated by a top drive 14 (or power swivel) of any type well known in the art. While the pipe 32 (and consequently the BHA 42 and bit 40) as well is turned, a pump 20 lifts drilling fluid ("mud") 18 from a pit or tank 24 and moves it through a stand pipe/hose assembly 16 to the top drive 14 so that the mud 18 is forced through the interior of the pipe segments 32 and then the BHA 42. Ultimately, the mud 18 is discharged through nozzles or water courses (not shown) in the bit 40, where it lifts drill cuttings (not shown) to the earth's surface through an annular space between the wall of the wellbore 22 and the exterior of the pipe 32 and the BHA 42. The mud 18 then flows up through a surface casing 23 to a wellhead and/or return line 26. After removing drill cuttings using screening devices (not shown in FIG. 1), the mud 18 is returned to the tank 24.

The standpipe system 16 includes a pressure transducer 28 which generates an electrical or other type of signal corresponding to the mud pressure in the standpipe 16. The pressure transducer 28 is operatively connected to systems (not shown separately in FIG. 1) inside a recording unit 12 for decoding, recording and interpreting signals communicated from the MWD system 37. As is known in the art, the MWD system 37 includes a device, which will be explained below with reference to FIG. 1A, for modulating the pressure of the mud 18 to communicate data to the earth's surface. In some embodiments the recording unit 12 includes a remote communication device 44 such as a satellite transceiver or radio transceiver, for communicating data received from the MWD system 37 (and other sensors at the earth's surface) to a remote location. Such remote communication devices are well known in the art. The data detection and recording elements shown in FIG. 1, including the pressure transducer 28 and recording unit 12 are only examples of data receiving and recording systems which may be used with the invention, and accordingly, are not intended to limit the scope of the invention, The top drive 14 may also include a sensor, shown generally at 14B, for measuring rotational speed of the drill string, and the torque applied to the drill string. The signals from these sensors 14B may be communicated to the recording unit 12 for processing. A sensor for measuring axial load supported by the top drive 14 is shown at 14A, and is referred to as a "weight on bit" sensor or "hookload" sensor.

Figure 1A:
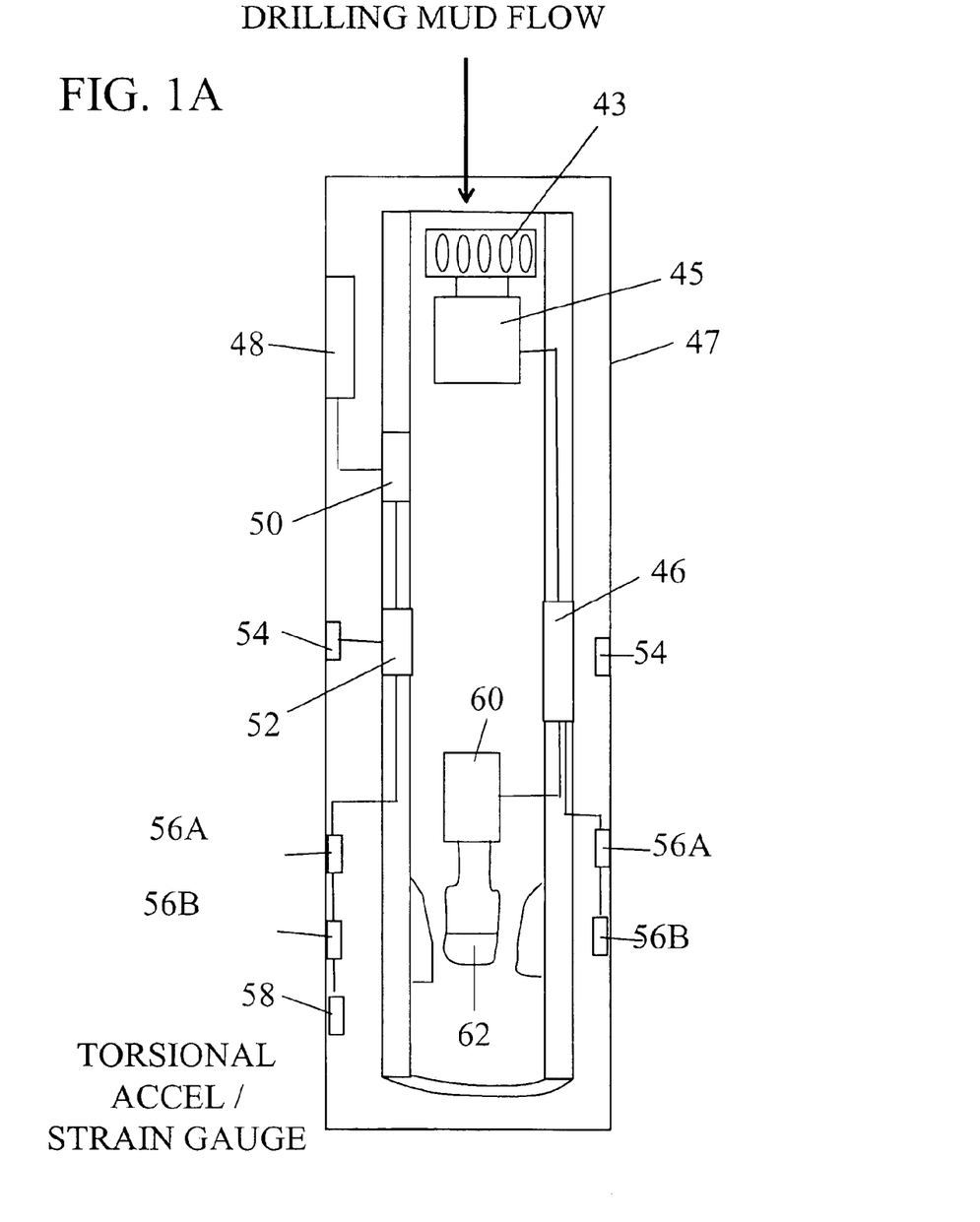
FIG. 1A shows an electromagnetic measurement while drilling well logging instrument in more detail.

One embodiment of an MWD system, such as shown generally at 37 in FIG. 1, is shown in more detail in FIG. 1A. The MWD system 37 is typically disposed inside a housing 47 made from a non-ferromagnetic, electrically conductive, metallic, high strength material, for example monel or the like. The housing 47 is adapted to be coupled within the drill string at its axial ends. The housing 47 is typically configured to behave mechanically in a manner similar to other drill collars (36 in FIG. 1). The housing 47 includes disposed therein a turbine 43 which converts some of the flow of mud (18 in FIG. 1) into rotational energy to drive an alternator 45 or generator to power various electrical circuits and sensors in the MWD system 37. Other types of MWD systems may include batteries as an electrical power source.

Control over the various functions of the MWD system 37 may be performed by a central processor 46. The processor 46 may also include circuits for recording signals generated by the various sensors in the MWD system 37. In this embodiment, the MWD system 37 includes a directional sensor 50, having therein tri-axial magnetometers and accelerometers such that the orientation of the MWD system 37 with respect to magnetic north and with respect to the direction of the Earth's gravity can be determined. The MWD system 37 may also include a gamma-ray detector 48 and separate rotational (angular)/axial accelerometers or strain gauges, shown generally at 58. The MWD system 37 includes an electromagnetic induction sensor system, including an AC signal generator/receiver circuits 52, and transmitter antenna 54 and receiver 56A, 56B antennas. The induction sensor system can be of any type well known in the art for measuring electrical properties of the formations (13 in FIG. 1) surrounding the wellbore (22 in FIG. 1). One example of an electromagnetic induction sensor system is shown in U.S. Pat. No. 5,144,245 issued to Wisler. The system shown in the Wisler '245 patent explores the earth formations with a substantially continuous wave signal at about 2 MHz frequency. A phase and amplitude difference between signals detected at each of the two receiver antennas 56A, 56B is measured and is related to the electrical conductivity of the earth formations (13 in FIG. 1). Another type of electromagnetic induction sensor system is disclosed in U.S. Pat. No. 5,955,884 issued to Payton et al. and, for example in Published U.S. patent application Ser. No. 20030038634 filed by Strack. The system disclosed in the Payton et al. '884 patent includes a transient electromagnetic signal generator, such as a square wave or triangle wave generator, which when passed through the transmitter antenna 54 induces transient electromagnetic effects in the formations (13 in FIG. 1). Voltages induced in the receiver antennas 56A, 56B may be detected by circuits in the transmitter/receiver system 52 and used to infer certain electrical properties of the formations (13 in FIG. 1). Generally, an induction well logging instrument according to the invention only requires one transmitter antenna, such as shown at 54 in FIG. 1A, and one receiver antenna, such as shown at 56B in FIG. 1A. Other embodiments of an instrument according to the invention may use different numbers of and different types of electromagnetic induction antennas, and may measure different signals corresponding to different electrical properties of the earth formations. Accordingly, the embodiment of antennas and circuits shown in FIG. 1A is not intended to limit the scope of the invention.

The central processor 46 periodically interrogates each of the sensors in the MWD system 37 and may store the interrogated signals from each sensor in a memory or other storage device associated with the processor 46. Some of the sensor signals may be formatted for transmission to the earth's surface in a mud pressure modulation telemetry scheme. In the embodiment of FIG. 1A, the mud pressure is modulated by operating an hydraulic cylinder 60 to extend a pulser valve 62 to create a restriction to the flow of mud through the housing 47. The restriction in mud flow increases the mud pressure, which is detected by the transducer (28 in FIG. 1). Operation of the cylinder 60 is typically controlled by the processor 46 such that the selected data to be communicated to the earth's surface are encoded in a series of pressure pulses detected by the transducer (28 in FIG. 1) at the surface. Many different data encoding schemes using a mud pressure modulator, such as shown in FIG. 1A, are well known in the art. Accordingly, the type of telemetry encoding is not intended to limit the scope of the invention. Other mud pressure modulation techniques which may also be used with the invention include so-called "negative pulse" telemetry, wherein a valve is operated to momentarily vent some of the mud from within the MWD system to the annular space between the housing and the wellbore. Such venting momentarily decreases pressure in the standpipe (16 in FIG. 1). Other mud pressure telemetry includes a so-called "mud siren", in which a rotary valve disposed in the MWD housing 47 creates standing pressure waves in the mud, which may be modulated using such techniques as phase shift keying for detection at the earth's surface. Other electromagnetic, hard wired (electrical conductor), or optical fiber or hybrid telemetry systems may be used as alternatives to mud pulse telemetry, as will be further explained below.

The well logging instrument shown in FIGS. 1 and 1A, as previously explained, is included in a drill collar forming part of the BHA (37 in FIG. 1). As is known in the art, various components of the BHA 37 are typically formed from high strength, electrically conductive materials, such as steel or monel. Monel is preferred in some embodiments because it is not ferromagnetic, and makes possible the use of magnetometers therein for determining orientation of the instrument with respect to the Earth's magnetic field.

Figure 2:
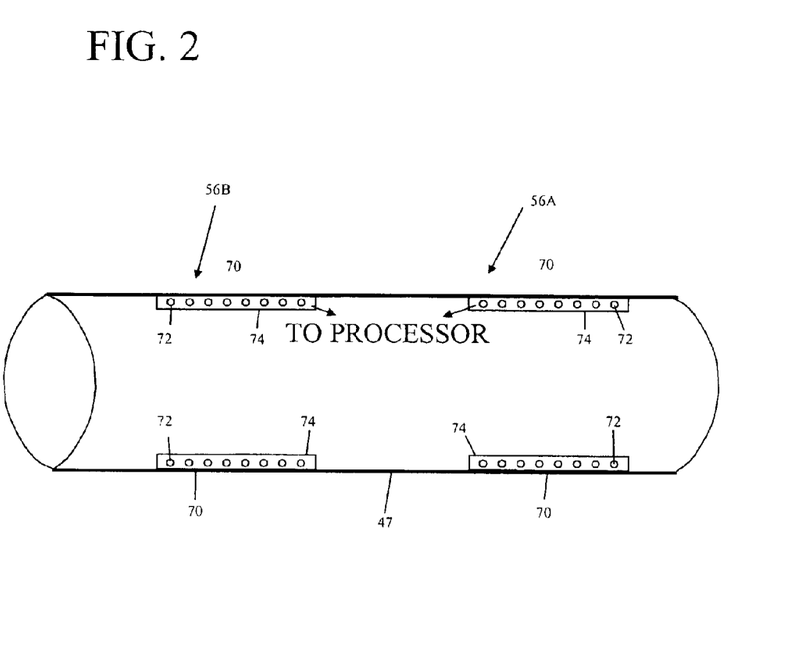
FIG. 2 shows a basic example structure of an electromagnetic induction instrument that can be used with methods according to the invention.

Irrespective of the exact arrangement of sensors, antennas and other electronic devices in any embodiment of a system according to the invention, a basic structure of electromagnetic induction measuring apparatus to which methods according to the invention may apply is shown in FIG. 2. Generally, the well logging instrument includes an electrically conductive metal (steel, monel or similar material known in the art) support in the center. In FIG. 2, as in the case of typical MWD embodiments of an instrument according to the invention, the support is the housing (or mandrel) itself, shown at 47. It should be noted that in so-called "wireline" embodiments of an instrument according to the invention, the support may be in the form of a rod or pole, such as disclosed in U.S. Pat. No. 4,651,101 issued to Barber et al., referred to above. In the MWD embodiment shown in FIG. 2, the housing 47 includes recesses 74 in the exterior surface thereof. Antennas, shown at 56A and 56B may include wire coils 72 disposed in each recess 74. The coils 72 may each be provided with a protective cover 70. The covers 70 can be non-conductive half shells coupled to the exterior of the housing 47, or may be slotted metal half shells coupled to the exterior of the housing 47. Various types of covers are known in the art for use on a structure similar to that shown in FIG. 2. At least one of the antennas 56A, 56B is used as an electromagnetic transmitter. The other one of the antennas 56B, 56A may be used as an electromagnetic receiver according to any method or system known in the art for measuring electromagnetic properties of earth formations. The coils 72 are respectively coupled to appropriate circuits (not shown) ultimately coupled to the processor (46 in FIG. 1A) to energize the coil(s) and/or detect voltages induced in the coil(s). Other embodiments, such as used, for example, in nuclear magnetic resonance measurement, may include only a single antenna, Such as shown in FIG. 2, that is used for both transmitter and receiver functions. Other embodiments may include ferromagnetic shielding between the housing and the antennas, as will be further explained below with respect to FIG. 2A.

Having explained a general structure of an electromagnetic induction apparatus that can be used with methods according to the invention, example methods according to the invention will now be explained. An electromagnetic antenna "test system" can be configured with antennas arranged substantially as shown in FIG. 2 with respective circuits coupled to the antennas. The test system, however, excludes the conductive housing (47 in FIG. 2). The antenna coil(s) in the test system may be suspended at appropriate positions in the air, or they may be disposed about an electrically non-conductive support, such as would be used for conventional electromagnetic induction logging instruments. The coil(s) and circuits coupled thereto in the test system should as closely as possible match the physical configuration of the coil(s) and circuits used in the actual well logging apparatus that includes the electrically conductive housing. The test system configured as explained above to exclude the conductive housing (or sonde support) will be referred to as the "test system."

Figure 3:
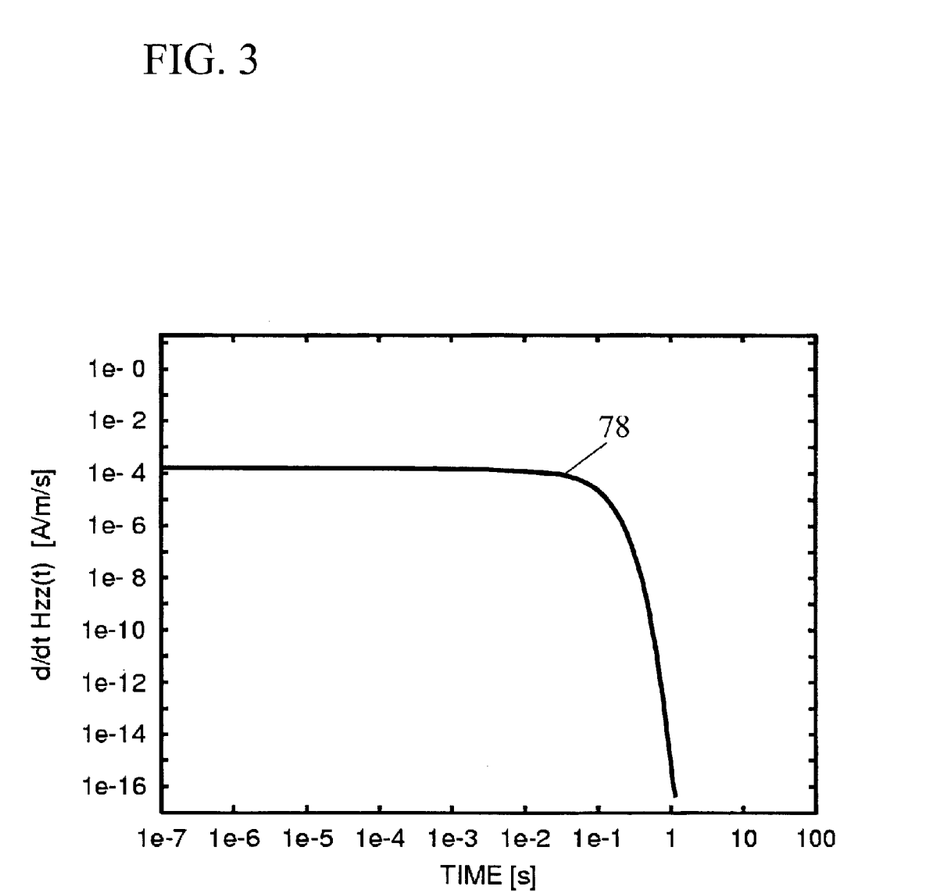
FIG. 3 shows an example response of a transient EM system in a non conductive environment and without a conductive sonde support.

Next, the test system is disposed in a substantially electrically non-conductive environment, such as in the air a suitable distance away from electrically conductive things. A response of the test system is measured. Measuring the test system response may include energizing the coil(s) that are to perform the function of transmitter in substantially the same manner of energizing the transmitter(s) as will be performed in making actual measurements of earth formations from within a wellbore. One example of energizing the transmitter coil includes passing an electrical current such as a square wave having a selected frequency through the transmitter coil. See the Payton et al. '884 patent referred to above, incorporated herein by reference. Voltages induced in the receiver coil are then measured. An example test system response is shown in the graph of FIG. 3. The time axis of the graph in FIG. 3 represents time from cessation of current passing through the transmitter in the case of a square wave, this time would be measured from each zero crossing of the energizing current waveform. The ordinate axis represents amplitude of the induced voltages in the receiver. The response is shown by curve 78.

Figure 4:
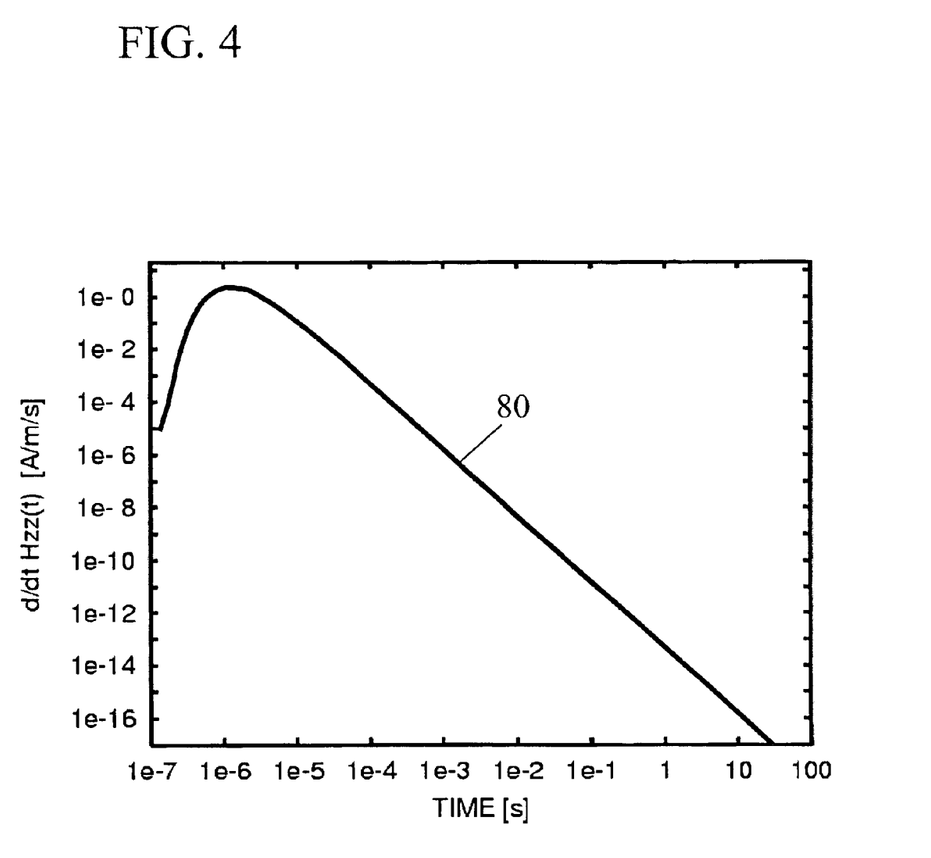
FIG. 4 shows an example response of the system of FIG. 3, but in a 10 Ohm-m environment.

Next, a test system response may be measured in an environment having a selected, and known conductivity (or resistivity). FIG. 4 shows an example response of the test system in a 10 Ohm-m environment at curve 80. Such measurements can be performed, for example, in a tank filled with water having a selected conductive ion concentration (such as a selected concentration in solution of table salt—sodium chloride).

Figure 5:
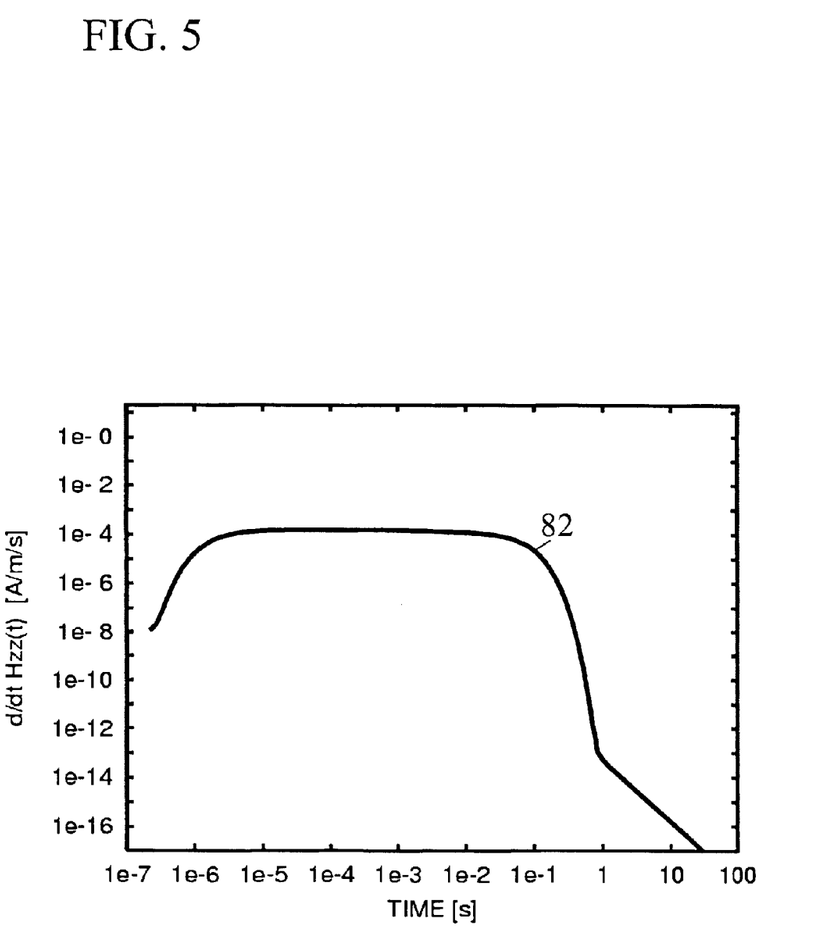
FIG. 5 shows an example response of a transient EM system including a conductive sonde support in a 10 Ohm-m environment.

After having characterized the response of the test system, a system as will be actually used in a wellbore (the "actual system"), and having the conductive housing (or sonde support) therein, can have its response characterized in a manner similar to that of the test system. In FIG. 5, a response of an actual system in a 10 Ohm-m environment is shown at curve 82.

Figure 6:
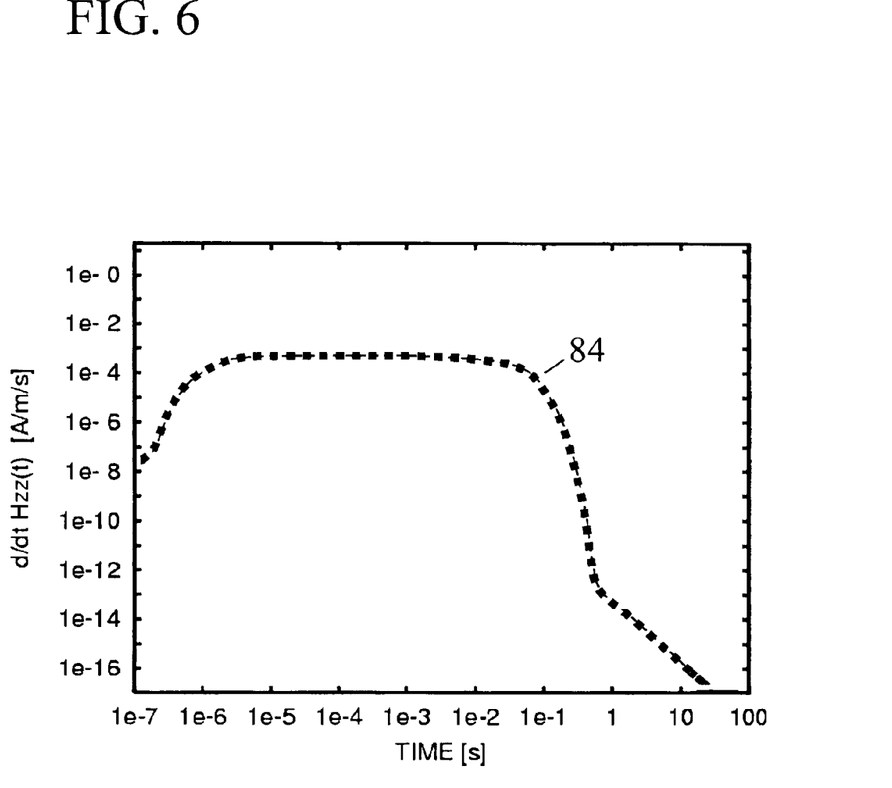
FIG. 6 shows a comparison of the system response of FIG. 4 convolved with a convolution operator to the response of the system of FIG. 5.

Then, a convolution operator is determined that causes the response of the test system to substantially match the response of the actual system. FIG. 6 shows a comparison of the response of the test system to the response of the actual system after applying a convolution operator adapted to simulate the effect of the housing on the total system response. Having thus determined a convolution operator, a deconvolution operator may be determined using methods so that measured response of the actual system to formations surrounding a wellbore can be deconvolved to approximate the response of the test system to the same earth formations. During well logging operations, measurements made by the actual system can be processed (in real time or afterward) using the deconvolution operator determined as explained above to generate a set of measurements of electromagnetic induction properties of the earth formations in which effects of the conductive housing or sonde support have been substantially reduced, or even eliminated.

Figure 2A:
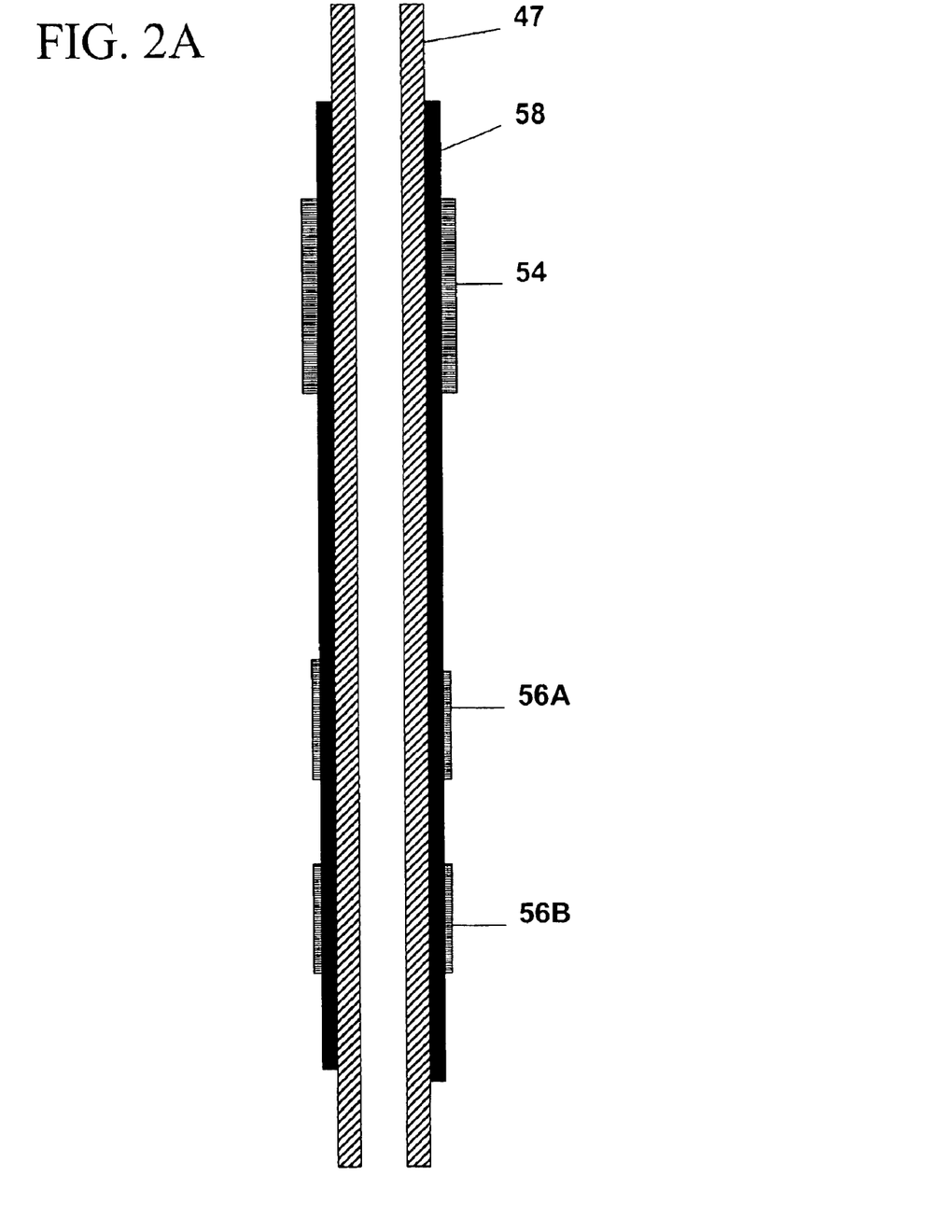
FIG. 2A shows an example instrument structure including ferrite shielding under its antennas.

In one embodiment, the actual system may include ferromagnetic shielding between the conductive housing and the antennas, over the axial span between the most widely spaced antennas, to reduce the effects of the conductive housing. Residual effect of the conductive housing may be accounted by using the deconvolution process described above. An example embodiment of an actual system including the shielding is shown in FIG. 2A. The housing 47 is made from electrically conductive material, as previously explained. A shield made of magnetically permeable material having relatively low electrical conductivity, shown at 58, is disposed on the outer surface of the housing 47. Antennas are shown at 56A, 56B and 54, wound around the outside of the shield 58. The shield generally extends the entire axial distance between the most spaced apart ones of the antennas (56B and 54 in FIG. 2A). Embodiments such as shown in FIG. 2A may have reduced effect of the housing even before deconvolution as in the method of the present invention.

Several different types of deconvolution may be used in various embodiments of a method according to the invention. One such type of deconvolution is known as direct deconvolution. Direct deconvolution can be performed in the frequency domain, for example. Data measured in the time domain may be transformed to the frequency domain by a fast Fourier transform or similar process known in the art. In this example of direct deconvolution, the Fourier transformed actual system response can be divided by (or into) the Fourier transformed test system response to obtain a convolution function. The convolution function can be inverted to determine the deconvolution operator. Direct deconvolution may also be performed in the time domain.

Another type of deconvolution is known as iterative deconvolution. Iterative deconvolution is preferred for embodiments of an electromagnetic measurement system which will measured transient response of earth formations, such as for the example responses described above with respect to FIGS. 3–6. Iterative deconvolution may be used in such embodiments because the measurements represent a time-limited set of data rather than a substantially continuous measurement set, as in so-called frequency domain electromagnetic induction measurements. The deconvolution output is also time limited.

Under the condition that the input data and output data are time limited, deconvolution may be implemented by solving a system of linear equations. Example iterative deconvolution methods are described in, Ioup, G. E. and Ioup, J. W., *Iterative Deconvolution*, Geophysics 48, pp. 1287–1290, Society of Exploration Geophysicists (1983).

Another type of deconvolution that may be used in various embodiments of the invention is called parameterized deconvolution. This type of deconvolution is also particularly appropriate for transient EM measurements because the response of a transient EM instrument can be described by a series of exponential decay functions of the form:

$$h(t) = \sum_k a_k e^{-b_k t}$$

where a and b are parameters related to the system response and the characteristics of the Earth formations surrounding the well logging instrument. Parameterized deconvolution is described, for example, in Hanstein, T., *Iterative und parametrisierte Deconvolution fuer LOTEM Daten*, 14. Kolloquium Elektromagnetische Tiefenforschung, pp. 163–172 (1992), and in Stolz, E. and Macnae, J., *Evaluation of EM waveforms bit singular value decompositions of exponential basis functions*, Geophysics 63, 1, pp. 64–74, Society of Exploration Geophysicists (1998).

Another type of deconvolution that may be used in embodiments of the invention is called embedded deconvolution. An example of embedded deconvolution includes generating an initial model of earth formations, and calculating a response that would obtain to the initial model of an instrument used to make actual measurements of the earth formations. The actual response of the instrument is then compared to the calculated response. The initial model is then adjusted, the response again calculated, and compared to the measured response. This process is repeated until differences between the measured response and the calculated response reach a minimum. The foregoing process is well known in the art as inversion. In embedded deconvolution, the calculated response of the instrument can be made on an instrument configured as the test system described above. The test system calculated response can then be convolved with a convolution operator determined as explained above with respect to FIGS. 3–6. The test system response convolved with the convolution operator is then compared to the actual system measurements. A possible advantage of using embedded deconvolution is that convolution is easier to perform mathematically and is more stable mathematically. An example of embedded deconvolution is described in Strack, K. M., *Long offset transient electromagnetic (LOTEM) depth soundings applied to crustal studies in the Black Forest*, Geophysics 55, pp. 834–842, Society of Exploration Geophysicists (1990).

Well logging methods according to the invention provide, in some embodiments, provide a way to make electromagnetic induction measurements where antennas are disposed on a conductive sonde support. Such embodiments have particular application in measurement while drilling instrument systems where the instrument components must be disposed in a conductive, metallic drill collar.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An electromagnetic induction logging method, comprising:

measuring electromagnetic induction response in earth formations surrounding a wellbore, the measuring performed on an electrically conductive sonde support;

deconvolving the measured response with respect to a response of an instrument not having an electrically conductive sonde support.

2. The method of claim 1 wherein the instrument not having the electrically conductive sonde support comprises an antenna arrangement substantially the same as an antenna arrangement used in the measuring on the electrically conductive sonde support.

3. The method of claim 1 wherein the deconvolving comprises embedded deconvolution.

4. The method of claim 1 wherein the deconvolving comprises parameterized deconvolution.

5. The method of claim 1 wherein the deconvolving comprises iterative deconvolution.

6. The method of claim 1 wherein the deconvolving comprises direct deconvolution.

7. The method of claim 1 wherein the measuring comprises transient electromagnetic induction.

8. The method of claim 1 wherein the measuring comprises moving an instrument along the wellbore using a drill string.

9. The method of claim 1 wherein the measuring comprises moving the instrument along the wellbore using an electrical cable.

10. The method of claim 1 further comprising magnetically shielding an antenna system disposed outside the conductive sonde support, the antenna system used to energize the formations with electromagnetic radiation and to detect electromagnetic phenomena from within the formations.

11. An electromagnetic induction logging method, comprising:

characterizing response of an electromagnetic well logging instrument having an antenna system disposed on an electrically conductive support within a known conductivity environment;

characterizing response of an antenna system and a circuit system physically arranged substantially the same as the antenna system and a circuit system within the well logging instrument, the characterizing performed in substantially the same known conductivity environment;

determining a convolution operator which causes the response of the antenna and circuit system to substantially match the response of the well logging instrument;

determining a deconvolution operator from the convolution operator;

measuring electromagnetic induction response in earth formations surrounding a wellbore using the well logging instrument;

deconvolving the measured response in the earth formations using the deconvolution operator.

12. The method of claim 11 wherein the deconvolving comprises embedded deconvolution.

13. The method of claim 11 wherein the deconvolving comprises parameterized deconvolution.

14. The method of claim 11 wherein the deconvolving comprises iterative deconvolution.

15. The method of claim 11 wherein the deconvolving comprises direct deconvolution.

16. The method of claim 11 wherein the measuring comprises transient electromagnetic induction.

17. The method of claim 11 wherein the measuring comprises moving an instrument along the wellbore using a drill string.

18. The method of claim 11 wherein the measuring comprises moving the instrument along the wellbore using an electrical cable.

19. The method of claim 11 wherein the known conductivity comprises substantially zero conductivity.

20. The method of claim 11 further comprising magnetically shielding the antenna system from effects of the conductive sonde support, the antenna system used to energize the earth formations with electromagnetic radiation and to detect electromagnetic phenomena from within the formations.

21. A method for logging while drilling, comprising:

rotating a drill string having a drill bit at a bottom end thereof in a wellbore, the drill string including an electromagnetic induction measuring instrument disposed in an electrically conductive drill collar coupled in the drill string above the drill bit, the instrument including at least one antenna and circuits coupled thereto for measuring an electromagnetic induction property of earth formations surrounding the wellbore;

measuring electromagnetic induction response of formations penetrated by the drill bit using the instrument; and deconvolving the measured induction response with respect to a response of an instrument not having an electrically conductive sonde support.

22. The method of claim 21 wherein the instrument not having the electrically conductive sonde support comprises an antenna arrangement substantially the same as the instrument disposed in the electrically conductive drill collar.

23. The method of claim 21 wherein the deconvolving comprises embedded deconvolution.

24. The method of claim 21 wherein the deconvolving comprises parameterized deconvolution.

25. The method of claim 21 wherein the deconvolving comprises iterative deconvolution.

26. The method of claim 21 wherein the deconvolving comprises direct deconvolution.

27. The method of claim 21 wherein the measuring induction response of the formation comprises transient electromagnetic induction.

28. The method of claim 21 further comprising magnetically shielding an antenna system disposed outside the conductive sonde support, the antenna system used to energize the formations with electromagnetic radiation and to detect electromagnetic phenomena from within the formations.

* * * * *